United States Patent
Baird et al.

(10) Patent No.: US 9,670,413 B2
(45) Date of Patent: Jun. 6, 2017

(54) METHODS AND APPARATUSES FOR THERMALLY CONVERTING BIOMASS

(75) Inventors: Lance Awender Baird, Prospect Heights, IL (US); Barry Freel, Greely (CA); Doug Clarke, Ottowa (CA); Gregory Joseph Morin, Chicago, IL (US)

(73) Assignee: Ensyn Renewables, Inc., Wilmington, DE (US)

( * ) Notice: Subject to any disclaimer, the term of this patent is extended or adjusted under 35 U.S.C. 154(b) by 712 days.

(21) Appl. No.: 13/536,538

(22) Filed: Jun. 28, 2012

(65) Prior Publication Data

US 2014/0001026 A1    Jan. 2, 2014

(51) Int. Cl.
| | | |
|---|---|---|
| *C10B 49/22* | (2006.01) | |
| *C10B 53/02* | (2006.01) | |
| *C10B 49/00* | (2006.01) | |
| *C10B 49/16* | (2006.01) | |
| *C10B 49/20* | (2006.01) | |
| *C10B 49/10* | (2006.01) | |

(52) U.S. Cl.
CPC .............. *C10B 49/10* (2013.01); *C10B 49/22* (2013.01); *C10B 53/02* (2013.01); *C10B 49/00* (2013.01); *C10B 49/16* (2013.01); *C10B 49/20* (2013.01); *Y02E 50/14* (2013.01); *Y02P 20/145* (2015.11)

(58) Field of Classification Search
CPC ......... C10B 49/16; C10B 49/00; C10B 49/02; C10B 49/04; C10B 49/06; C10B 49/08; C10B 49/10; C10B 49/12; C10B 49/18; C10B 49/20; C10B 49/22; C10B 47/18; C10B 47/20; C10B 47/22; C10B 47/24; G01N 2201/0233

See application file for complete search history.

(56) References Cited

U.S. PATENT DOCUMENTS

| | | |
|---|---|---|
| 1,252,072 A | 1/1918 | Abbot |
| 2,205,757 A | 6/1940 | Wheat |
| 2,318,555 A | 5/1943 | Ruthruff |

(Continued)

FOREIGN PATENT DOCUMENTS

| | | |
|---|---|---|
| BR | 8304158 | 7/1984 |
| BR | 8304794 | 4/1985 |

(Continued)

OTHER PUBLICATIONS

"Flash Pyrolysis for the Continuous Conversion of Reed Into Hydrocarbons," Mahmood M. Barbooti, Journal of Analytical and Applied Pyrolysis, 13 (1988), 233-241.

(Continued)

*Primary Examiner* — In Suk Bullock
*Assistant Examiner* — Jonathan Pilcher
(74) *Attorney, Agent, or Firm* — Jones Day

(57) ABSTRACT

Methods and apparatuses for thermally converting or pyrolyzing biomass are provided. In one embodiment, a method of thermally converting biomass includes introducing the biomass to a reactor feed chamber. The method provides for flowing a low oxygen gas into the reactor feed chamber to purge the reactor feed chamber and biomass of oxygen. The method also includes delivering the purged biomass to a thermal conversion reactor and thermally converting the biomass in the thermal conversion reactor.

18 Claims, 5 Drawing Sheets

(56) References Cited

U.S. PATENT DOCUMENTS

| | | |
|---|---|---|
| 2,326,525 A | 8/1943 | Diwoky |
| 2,328,202 A | 8/1943 | Doerner |
| 2,380,098 A | 7/1945 | Doerner |
| 2,492,948 A | 1/1950 | Berger |
| 2,566,353 A | 9/1951 | Mills |
| 2,696,979 A | 12/1954 | Berge |
| 2,884,303 A | 4/1959 | William |
| 3,130,007 A | 4/1964 | Breck |
| 3,309,356 A | 3/1967 | Esterer |
| 3,313,726 A | 4/1967 | Campbell et al. |
| 3,445,549 A | 5/1969 | Hakulin |
| 3,467,502 A | 9/1969 | Davis |
| 3,694,346 A | 9/1972 | Blaser et al. |
| 3,696,022 A | 10/1972 | Hutchings |
| 3,760,870 A | 9/1973 | Guetlhuber |
| 3,776,533 A | 12/1973 | Vlnaty |
| 3,814,176 A | 6/1974 | Seth |
| 3,853,498 A | 12/1974 | Bailie |
| 3,876,533 A | 4/1975 | Myers |
| 3,890,111 A | 6/1975 | Knudsen |
| 3,907,661 A | 9/1975 | Gwyn et al. |
| 3,925,024 A | 12/1975 | Hollingsworth et al. |
| 3,927,996 A | 12/1975 | Knudsen et al. |
| 3,959,420 A | 5/1976 | Geddes et al. |
| 4,003,829 A | 1/1977 | Burger et al. |
| 4,032,305 A | 6/1977 | Squires |
| 4,039,290 A | 8/1977 | Inada et al. |
| 4,052,265 A | 10/1977 | Kemp |
| 4,064,018 A | 12/1977 | Choi |
| 4,064,043 A | 12/1977 | Kollman |
| 4,085,030 A | 4/1978 | Green et al. |
| 4,101,414 A | 7/1978 | Kim et al. |
| 4,102,773 A | 7/1978 | Green et al. |
| 4,103,902 A | 8/1978 | Steiner et al. |
| 4,138,020 A | 2/1979 | Steiner et al. |
| 4,145,274 A | 3/1979 | Green et al. |
| 4,153,514 A | 5/1979 | Garrett et al. |
| 4,157,245 A | 6/1979 | Mitchell et al. |
| 4,165,717 A | 8/1979 | Reh et al. |
| 4,204,915 A | 5/1980 | Kurata et al. |
| 4,210,492 A | 7/1980 | Roberts |
| 4,219,537 A | 8/1980 | Steiner |
| 4,225,415 A | 9/1980 | Mirza et al. |
| 4,233,119 A | 11/1980 | Meyers et al. |
| 4,245,693 A | 1/1981 | Cheng |
| 4,272,402 A | 6/1981 | Mayes |
| 4,284,616 A | 8/1981 | Solbakken et al. |
| 4,298,453 A | 11/1981 | Schoennagel et al. |
| 4,300,009 A | 11/1981 | Haag et al. |
| 4,301,771 A | 11/1981 | Jukkola et al. |
| 4,306,619 A | 12/1981 | Trojani |
| 4,308,411 A | 12/1981 | Frankiewicz |
| 4,311,670 A | 1/1982 | Nieminen et al. |
| 4,317,703 A | 3/1982 | Bowen et al. |
| 4,321,096 A | 3/1982 | Dobbin |
| 4,324,637 A | 4/1982 | Durai-Swamy |
| 4,324,641 A | 4/1982 | Durai-Swamy |
| 4,324,642 A | 4/1982 | Durai-Swamy |
| 4,324,644 A | 4/1982 | Durai-Swamy |
| 4,325,327 A | 4/1982 | Kantesaria et al. |
| 4,334,893 A | 6/1982 | Lang |
| 4,336,128 A | 6/1982 | Tamm |
| 4,341,598 A | 7/1982 | Green |
| 4,344,770 A | 8/1982 | Capener et al. |
| 4,364,796 A | 12/1982 | Ishii et al. |
| 4,373,994 A | 2/1983 | Lee |
| 4,415,434 A | 11/1983 | Hargreaves et al. |
| 4,422,927 A | 12/1983 | Kowalczyk |
| 4,434,726 A | 3/1984 | Jones |
| 4,443,229 A | 4/1984 | Sageman et al. |
| 4,456,504 A | 6/1984 | Spars et al. |
| 4,482,451 A | 11/1984 | Kemp |
| 4,495,056 A | 1/1985 | Venardos et al. |
| 4,504,379 A | 3/1985 | Stuntz et al. |
| 4,537,571 A | 8/1985 | Buxel et al. |
| 4,548,615 A | 10/1985 | Longchamp et al. |
| 4,552,203 A | 11/1985 | Chrysostome et al. |
| 4,574,743 A | 3/1986 | Claus |
| 4,584,064 A | 4/1986 | Ciais et al. |
| 4,584,947 A | 4/1986 | Chittick |
| 4,595,567 A | 6/1986 | Hedrick |
| 4,615,870 A | 10/1986 | Armstrong et al. |
| 4,617,693 A | 10/1986 | Meyers et al. |
| 4,645,568 A | 2/1987 | Kurps et al. |
| 4,668,243 A | 5/1987 | Schulz |
| 4,678,860 A | 7/1987 | Kuester |
| 4,684,375 A | 8/1987 | Morin et al. |
| 4,710,357 A | 12/1987 | Cetinkaya et al. |
| 4,714,109 A | 12/1987 | Tsao |
| 4,732,091 A | 3/1988 | Gould |
| 4,795,841 A | 1/1989 | Elliott et al. |
| 4,796,546 A | 1/1989 | Herstad et al. |
| 4,823,712 A | 4/1989 | Wormer |
| 4,828,581 A | 5/1989 | Feldmann et al. |
| 4,849,091 A | 7/1989 | Cabrera et al. |
| 4,880,473 A | 11/1989 | Scott et al. |
| 4,881,592 A | 11/1989 | Cetinkaya |
| 4,891,459 A | 1/1990 | Knight et al. |
| 4,897,178 A | 1/1990 | Best et al. |
| 4,931,171 A | 6/1990 | Piotter |
| 4,940,007 A | 7/1990 | Hiltunen et al. |
| 4,942,269 A | 7/1990 | Chum et al. |
| 4,968,325 A | 11/1990 | Black et al. |
| 4,983,278 A | 1/1991 | Cha et al. |
| 4,987,178 A | 1/1991 | Shibata et al. |
| 4,988,430 A | 1/1991 | Sechrist et al. |
| 4,992,605 A | 2/1991 | Craig et al. |
| 5,009,770 A | 4/1991 | Miller et al. |
| 5,011,592 A | 4/1991 | Owen et al. |
| 5,018,458 A | 5/1991 | Mcintyre et al. |
| 5,041,209 A | 8/1991 | Cha et al. |
| 5,059,404 A | 10/1991 | Mansour et al. |
| 5,077,252 A | 12/1991 | Owen et al. |
| 5,093,085 A | 3/1992 | Engstrom et al. |
| 5,136,117 A | 8/1992 | Paisley et al. |
| 5,212,129 A | 5/1993 | Lomas |
| 5,225,044 A | 7/1993 | Breu |
| 5,236,688 A | 8/1993 | Watanabe et al. |
| 5,239,946 A | 8/1993 | Garcia-Mallol |
| 5,243,922 A | 9/1993 | Rehmat et al. |
| 5,281,727 A | 1/1994 | Carver et al. |
| 5,306,481 A | 4/1994 | Mansour et al. |
| 5,326,919 A | 7/1994 | Paisley et al. |
| 5,343,939 A | 9/1994 | Cetinkaya |
| 5,371,212 A | 12/1994 | Moens |
| 5,376,340 A | 12/1994 | Bayer et al. |
| 5,380,916 A | 1/1995 | Rao |
| 5,395,455 A | 3/1995 | Scott et al. |
| 5,402,548 A | 4/1995 | Adair et al. |
| 5,407,674 A | 4/1995 | Gabetta et al. |
| 5,423,891 A | 6/1995 | Taylor |
| 5,426,807 A | 6/1995 | Grimsley et al. |
| 5,478,736 A | 12/1995 | Nair |
| 5,494,653 A | 2/1996 | Paisley |
| 5,520,722 A | 5/1996 | Hershkowitz et al. |
| 5,536,488 A | 7/1996 | Mansour et al. |
| 5,578,092 A | 11/1996 | Collin |
| 5,584,985 A | 12/1996 | Lomas |
| 5,605,551 A * | 2/1997 | Scott et al. ............ 44/307 |
| 5,637,192 A | 6/1997 | Mansour et al. |
| 5,654,448 A | 8/1997 | Pandey et al. |
| 5,662,050 A | 9/1997 | Angelo, II et al. |
| 5,686,049 A | 11/1997 | Bonifay et al. |
| 5,703,299 A * | 12/1997 | Carleton et al. ......... 73/863.83 |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |
| 5,788,784 A | 8/1998 | Koppenhoefer et al. |
| 5,792,340 A | 8/1998 | Freel et al. |
| 5,853,548 A | 12/1998 | Piskorz et al. |
| 5,879,079 A * | 3/1999 | Hohmann et al. ......... 366/151.1 |
| 5,879,642 A | 3/1999 | Trimble et al. |
| 5,879,650 A | 3/1999 | Kaul et al. |

(56) References Cited

U.S. PATENT DOCUMENTS

| | | |
|---|---|---|
| 5,904,838 A | 5/1999 | Kalnes et al. |
| 5,915,311 A | 6/1999 | Muller et al. |
| 5,961,786 A | 10/1999 | Freel et al. |
| 5,969,165 A | 10/1999 | Liu |
| 6,002,025 A | 12/1999 | Page et al. |
| 6,011,187 A | 1/2000 | Horizoe et al. |
| 6,033,555 A | 3/2000 | Chen et al. |
| 6,106,702 A | 8/2000 | Sohn et al. |
| 6,113,862 A | 9/2000 | Jorgensen et al. |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,339,182 B1 | 1/2002 | Munson et al. |
| 6,398,921 B1 | 6/2002 | Moraski |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,497,199 B2 | 12/2002 | Yamada et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,680,137 B2 | 1/2004 | Paisley et al. |
| 6,743,746 B1 | 6/2004 | Prilutsky et al. |
| 6,759,562 B2 | 7/2004 | Gartside et al. |
| 6,768,036 B2 | 7/2004 | Lattner et al. |
| 6,776,607 B2 | 8/2004 | Nahas et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2 | 7/2007 | Hyppaenen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 | 8/2009 | Freel et al. |
| 7,572,365 B2 | 8/2009 | Freel et al. |
| 7,578,927 B2 | 8/2009 | Marker et al. |
| 7,625,432 B2 | 12/2009 | Gouman et al. |
| 7,811,340 B2 | 10/2010 | Bayle et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,090 B2 | 1/2012 | Freel et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,314,275 B2 | 11/2012 | Brandvold |
| 8,329,967 B2 | 12/2012 | Brandvold et al. |
| 8,404,910 B2 | 3/2013 | Kocal et al. |
| 8,499,702 B2 | 8/2013 | Palmas et al. |
| 8,519,203 B2 | 8/2013 | Marinangeli et al. |
| 8,519,205 B2 | 8/2013 | Frey et al. |
| 8,524,087 B2 | 9/2013 | Frey et al. |
| 8,575,408 B2 | 11/2013 | Marker et al. |
| 8,715,490 B2 | 5/2014 | Brandvold et al. |
| 8,726,443 B2 | 5/2014 | Freel et al. |
| 9,044,727 B2 | 6/2015 | Kulprathipanja et al. |
| 2002/0014033 A1 | 2/2002 | Langer et al. |
| 2002/0100711 A1 | 8/2002 | Freel et al. |
| 2002/0146358 A1 | 10/2002 | Smith et al. |
| 2003/0047437 A1* | 3/2003 | Stankevitch ............... 201/25 |
| 2003/0049854 A1* | 3/2003 | Rhodes ..................... 436/106 |
| 2003/0202912 A1 | 10/2003 | Myohanen et al. |
| 2004/0069682 A1 | 4/2004 | Freel et al. |
| 2004/0108251 A1* | 6/2004 | Gust et al. ................. 208/126 |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgcod et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0163053 A1 | 7/2006 | Ershag |
| 2006/0180060 A1 | 8/2006 | Crafton et al. |
| 2006/0185245 A1 | 8/2006 | Serio et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0010588 A1* | 1/2007 | Pearson ..................... 518/701 |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0006519 A1 | 1/2008 | Badger |
| 2008/0006520 A1 | 1/2008 | Badger |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0008296 A1 | 1/2009 | Sappok et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |

(56) References Cited

U.S. PATENT DOCUMENTS

| | | |
|---|---|---|
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0242377 A1 | 10/2009 | Honkola et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0274600 A1 | 11/2009 | Jain et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Frederiksen et al. |
| 2010/0133144 A1 | 6/2010 | Kokayeff et al. |
| 2010/0147743 A1 | 6/2010 | MacArthur et al. |
| 2010/0148122 A1 | 6/2010 | Breton et al. |
| 2010/0151550 A1 | 6/2010 | Nunez et al. |
| 2010/0158767 A1 | 6/2010 | Mehlberg et al. |
| 2010/0162625 A1 | 7/2010 | Mills |
| 2010/0163395 A1 | 7/2010 | Henrich et al. |
| 2010/0222620 A1 | 9/2010 | O'Connor et al. |
| 2010/0266464 A1* | 10/2010 | Sipila et al. .............. 422/187 |
| 2010/0325954 A1 | 12/2010 | Tiwari et al. |
| 2011/0017443 A1 | 1/2011 | Collins |
| 2011/0067438 A1 | 3/2011 | Bernasconi |
| 2011/0068585 A1 | 3/2011 | Dube et al. |
| 2011/0113675 A1 | 5/2011 | Fujiyama et al. |
| 2011/0120909 A1 | 5/2011 | Brandvold |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1 | 9/2011 | Wormsbecher et al. |
| 2011/0232166 A1 | 9/2011 | Kocal |
| 2011/0239530 A1 | 10/2011 | Marinangeli et al. |
| 2011/0253600 A1 | 10/2011 | Niccum |
| 2011/0258914 A1 | 10/2011 | Banasiak et al. |
| 2011/0284359 A1 | 11/2011 | Sechrist et al. |
| 2012/0012039 A1* | 1/2012 | Palmas .............. C10B 49/22 110/346 |
| 2012/0017493 A1 | 1/2012 | Traynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0108860 A1 | 5/2012 | Daugaard et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0205289 A1 | 8/2012 | Joshi |
| 2012/0214114 A1 | 8/2012 | Kim et al. |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1 | 3/2013 | Kulprathipanja et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0195727 A1 | 8/2013 | Bull et al. |
| 2013/0212930 A1 | 8/2013 | Naae et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |
| 2014/0142362 A1 | 5/2014 | Davydov et al. |

FOREIGN PATENT DOCUMENTS

| | | |
|---|---|---|
| CA | 1312497 | 1/1993 |
| CA | 2091373 | 9/1997 |
| CA | 2299149 | 12/2000 |
| CA | 2521829 | 3/2006 |
| CN | 1377938 | 11/2002 |
| CN | 1730177 | 2/2006 |
| CN | 101045524 | 10/2007 |
| CN | 101238197 | 8/2008 |
| CN | 101294085 | 10/2008 |
| CN | 101318622 | 12/2008 |
| CN | 101353582 | 1/2009 |
| CN | 101365770 | 2/2009 |
| CN | 101381611 | 3/2009 |
| CN | 101544901 | 9/2009 |
| CN | 101550347 | 10/2009 |
| CN | 101745349 | 6/2010 |
| CN | 101993712 | 3/2011 |
| EP | 105980 | 1/1986 |
| EP | 578503 | 1/1994 |
| EP | 676023 | 7/1998 |
| EP | 718392 | 9/1999 |
| EP | 787946 | 6/2000 |
| EP | 1420058 | 5/2004 |
| EP | 2325281 | 5/2011 |
| FI | 117512 | 11/2005 |
| FR | 879606 | 3/1943 |
| GB | 1019133 | 2/1966 |
| GB | 1300966 | 12/1972 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| SE | 9903742-6 | 1/2004 |
| WO | 81/01713 | 6/1981 |
| WO | 91/11499 | 8/1991 |
| WO | 92/07842 | 5/1992 |
| WO | 92/18492 | 10/1992 |
| WO | 94/13827 | 6/1994 |
| WO | 97/44410 | 11/1997 |
| WO | 01/09243 | 2/2001 |
| WO | 01/83645 | 11/2001 |
| WO | 02/49735 | 6/2002 |
| WO | 2006/071109 | 7/2006 |
| WO | 2007/017005 | 2/2007 |
| WO | 2007/045093 | 4/2007 |
| WO | 2007/050030 | 5/2007 |
| WO | 2007/112570 | 10/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/067350 | 5/2009 |
| WO | 2009/099684 | 8/2009 |
| WO | 2009/118357 | 10/2009 |

(56) References Cited

FOREIGN PATENT DOCUMENTS

| WO | 2009/118363 |    | 10/2009 |
|----|-------------|----|---------|
| WO | 2009/126508 |    | 10/2009 |
| WO | 2009/131757 |    | 10/2009 |
| WO | 2010/002792 |    | 1/2010  |
| WO | 2011/146262 |    | 11/2011 |
| WO | 2011/159768 | A2 | 12/2011 |
| WO | 2012/009207 |    | 1/2012  |
| WO | 2012/012260 |    | 1/2012  |
| WO | 2012/018520 | A2 | 2/2012  |
| WO | 2012/062924 |    | 5/2012  |
| WO | 2012/078422 |    | 6/2012  |
| WO | 2012/088546 |    | 6/2012  |
| WO | 2012/115754 |    | 8/2012  |
| WO | 2013/043485 |    | 3/2013  |
| WO | 2013/090229 |    | 6/2013  |
| WO | 2014/031965 |    | 2/2014  |
| WO | 2014/210150 |    | 12/2014 |

OTHER PUBLICATIONS

AccessScience Dictionary, "ebullating-bed reactor," http://www.accessscience.com, last visited Jul. 15, 2014.
Adam, J. "Catalytic conversion of biomass to produce higher quality liquid bio-fuels," PhD Thesis, Department of Energy and Process Engineering, The Norwegian University of Science and Technology, Trondheim (2005).
Adam, J. et al. "Pyrolysis of biomass in the presence of Al-MCM-41 type catalysts," Fuel, 84 (2005) 1494-1502.
Adjaye, John D. et al. "Catalytic conversion of a biomass-derived oil to fuels and chemicals I: Model compound studies and reaction pathways," Biomass & Bioenergy, 8:3 (1995) 131-149.
Adjaye, John D. et al. "Catalytic conversion of a biomass-derived oil to fuels and chemicals II: Chemical kinetics, parameter estimation and model predictions," Biomass & Bioenergy, 8:4 (1995) 265-277.
Adjaye, John D. et al. "Catalytic conversion of wood derived bio-oil to fuels and chemicals," Studies in Surface Science and Catalysis, 73 (1992) 301-308.
Adjaye, John D. et al. "Production of hydrocarbons by the catalytic upgrading of a fast pyrolysis bio-oil," Fuel Process Technol, 45:3 (1995) 161-183.
Adjaye, John D. et al. "Upgrading of a wood-derived oil over various catalysts," Biomass & Bioenergy, 7:1-6 (1994) 201-211.
Aho, A. et al. "Catalytic pyrolysis of woody biomass in a fluidized bed reactor; Influence of zeolites structure, Science Direct," Fuel, 87 (2008) 2493-2501.
Antonakou, E. et al. "Evaluation of various types of Al-MCM-41 materials as catalysts in biomass pyrolysis for the production of bio-fuels and chemicals," Fuel, 85 (2006) 2202-2212.
Atutxa, A. et al. "Kinetic Description of the Catalytic Pyrolysis of Biomass in a Conical Spouted Bed Reactor," Energy Fuels, 19:3 (2005) 765-774.
Baker, E. G. et al. "Catalytic Upgrading of Biomass Pyrolysis Oils," in Bridgwater, A. V. et al. (eds) Research in Thermochemical Biomass Conversion, Elsevier Science Publishers Ltd., Barking, England (1988) 883-895.
Baldauf, W. et al. "Upgrading of flash pyrolysis oil and utilization in refineries," Biomass & Bioenergy, 7 (1994) 237-244.
Baumlin, "The continuous self stirred tank reactor: measurement of the cracking kinetics of biomass pyrolysis vapours," Chemical Engineering Science, 60 (2005) 41-55.
Berg, "Reactor Development for the Ultrapyrolysis Process," The Canadian Journal of Chemical Engineering, 67 (1989) 96-101.
Bielansky, P. et al. "Catalytic conversion of vegetable oils in a continuous FCC pilot plant," Fuel Processing Technology, 92 (2011) 2305-2311.
Bimbela, F. et al. "Hydrogen production by catalytic steam reforming of acetic acid, a model compound of biomass pyrolysis liquids," J. Ana App. Pyrolysis, 79 (2007) 112-120.
Bridgwater et al. (eds) Fast Pyrolysis of Biomass: A Handbook, Newbury Cpl Press, Great Britain (2008) 1-13.
Bridgwater, A.V. "Principles and practices of biomass fast pyrolysis processes for liquids," Journal of Analytical and Applied Pyrolysis, 51 (1999) 3-22.
Bridgwater, Tony "Production of high grade fuels and chemicals from catalytic pyrolysis of biomass," Catalysis Today, 29 (1996) 285-295.
Bridgwater, Tony et al. "Transport fuels from biomass by thermal processing," EU-China Workshop on Liquid Biofuels, Beijing, China (Nov. 4-5, 2004).
Buchsbaum, A. et al. "The Challenge of the Biofuels Directive for a European Refinery," OMW Refining and Marketing, ERTC 9th Annual Meeting, Prague, Czech Republic (Nov. 15-17, 2004).
Carlson, T. et al. "Aromatic Production from Catalytic Fast Pyrolysis of Biomass-Derived Feedstocks," Top Catal, 52 (2009) 241-242.
Carlson., T. et al. "Green Gasoline by Catalytic Fast Pyrolysis of Solid Biomass Derived Compounds," ChemSusChem, 1 (2008) 397-400.
Cass et al. "Challenges in the Isolation of Taxanes from Taxus canadensis by Fast Pyrolysis," J Analytical and Applied Pyrolysis 57 (2001) 275-285.
Chantal, P. D. et al. "Production of Hydrocarbons from Aspen Poplar Pyrolytic Oils over H-ZSM5," Applied Catalysis, 10 (1984) 317-332.
Chen, N. Y. et al. "Fluidized Upgrading of Wood Pyrolysis Liquids and Related Compounds," in Soltes, E. J. et al. (eds) Pyrolysis Oils from Biomass, ACS, Washington, DC (1988) 277-289.
Chinsuwan, A. et al. "An experimental investigation of the effect of longitudinal fin orientation on heat transfer in membrane water wall tubes in a circulating ftuidized bed," International Journal of Heat and Mass Transfer, 52:5-6 (2009) 1552-1560.
Cornelissen, T. et al., "Flash co-pyrolysis of biomass with polylactic acid. Part 1: Influence on bio-oil yield and heating value," Fuel 87 (2008) 1031-1041.
Cousins, A. et al. "Development of a bench-scale high-pressure fluidized bed reactor and its sequential modification for studying diverse aspects of pyrolysis and gasification of coal and biomass," Energy and Fuels, 22:4 (2008) 2491-2503.
Cragg et al. "The Search for New Pharmaceutical Crops: Drug Discovery and Development at the National Cancer Institute," in Janick, J. and Simon, J.E. (eds) New Crops, Wiley, New York (1993) 161-167.
Czernik, S. et al. "Hydrogen from biomass-production by steam reforming of biomass pyrolysis oil," Catalysis Today, 129 (2007) 265-168.
Czernik, S. et al. "Hydrogren by Catalytic Steam Reforming of Liquid Byproducts from Biomass Thermoconversion Processes," Ind. Eng. Chem. Res., 41 (2002) 4209-4215.
Dahmen, "Rapid pyrolysis for the pretreatment of biomass and generation of bioslurry as intermediate fuel", Chemie-Ingenieur-Technik, 79:9 (2007) 1326-1327. Language: German (Abstract only; Machine translation of Abstract).
Dandik, "Catalytic Conversion of Used Oil to Hydrocarbon Fuels in a Fractionating Pyrolysis Reactor," Energy & Fuels, 12 (1998) 1148-1152.
Daoust et al. "Canada Yew (Taxus canadensis Marsh.) and Taxanes: a Perfect Species for Field Production and Improvement through Genetic Selection," Natural Resources Canada, Canadian Forest Service, Sainte-Fov, Quebec (2003).
de Wild, P. et al. "Lignin valorisation for chemicals and (transportation) fuels via (catalytic) pyrolysis and hydrodeoxygenation," Environ. Prog. Sustainable Energy, 28 (2009) 461-469.
Demirbas, Ayhan "Fuel Conversional Aspects of Palm Oil and Sunflower Oil," Energy Sources, 25 (2003) 457-466.
Di Blasi, C. et al. "Effects of Potassium Hydroxide Impregnation of Wood Pyrolysis, American Chemical Society," Energy & Fuels 23(2009) 1045-1054.
Ellioti, D. "Historical Developments in Hydroprocessing Bio-oils," Energy & Fuels, 21 (2007) 1792-1815.
Ensyn Technologies Inc. "Catalytic de-oxygenation of biomass-derived RTP vapors." Prepared for ARUSIA, Agenzia Regionale Umbria per lo Sviluppo e L'Innovazione, Perugia, Italy (Mar. 1997).

(56) References Cited

OTHER PUBLICATIONS

Filtration, Kirk-Othmer Encyclopedia of Chemical Technology 5th Edition. vol. 11., John Wiley & Sons, Inc., Feb. 2005.
Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.
Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.
Gevert, Börjie S. et al. "Upgrading of directly liquefied biomass to transportation fuels: catalytic cracking," *Biomass* 14:3 (1987) 173-183.
Goesele, W. et al., Filtration, Wiley-VCHVerlag GmbH & Co. KGaA, Weinheim, 10.1002/14356007.b0210, 2005.
Grange, P. et al. "Hydrotreatment of pyrolysis oils from biomass: reactivity of the various categories of oxygenated compounds and preliminary techno-economical study," *Catalysis Today*, 29 (1996) 297-301.
Hama, "Biodiesel-fuel production in a packed-bed reactor using lipase-producing Rhizopus oryzae cells immobilized within biomass support particles", *Biochemical Engineering Journal*, 34 (2007) 273-278.
Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.
Holton et al. "First Total Synthesis of Taxol. 2. Completion of the C and D Rings," *J Am Chem Soc*, 116 (1994) 1599-1600.
Horne, Patrick A. et al. "Catalytic coprocessing of biomass-derived pyrolysis vapours and methanol," *J. Analytical and Applied Pyrolysis*, 34:1 (1995) 87-108.
Horne, Patrick A. et al. "Premium quality fuels and chemicals from the fluidised bed pyrolysis of biomass with zeolite catalyst upgrading," *Renewable Energy*, 5:5-8 (1994) 810-812.
Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.
Huang et al. "New Taxanes from *Taxus brevifolia*," *J of Natural Products*, 49 (1986) 665-669.
Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).
Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).
Hughes, J. et al. "Structural variations in natural F, OH and CI apatites," *American Mineralogist*, 74 (1989) 870-876.
Huie, C. W. "A review of modern sample-preparation techniques for the extraction and analysis of medicinal plants," *Anal Bioanal Chem*, 373 (2002) 23-30.
International Search Report dated Feb. 22, 2013 for corresponding International Application No. PCT/US2012/68876.
Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.
Iojoiu, E. et al. "Hydrogen production by sequential cracking of biomass-derived pyrolysis oil over noble metal catalysts supported on ceria-zirconia," *Applied Catalysis A: General*, 323 (2007) 147-161.
Jackson, M. et al. "Screening heterogenous catalysts for the pyrolysis of lignin," *J. Anal. Appl. Pyrolysis*, 85 (2009) 226-230.
Junming et al. "Bio-oil upgrading by means of ethyl ester production in reactive distillation to remove water and to improve storage and fuel characteristics," *Biomass and Energy*, 32 (2008) 1056-1061.
Kalnes, Tom et al. "Feedstock Diversity in the Refining Industry," UOP Report to NREL and DOE (2004).
Khanal, "Biohydrogen Production in Continuous-Flow Reactor Using Mixed Microbial Culture," *Water Environment Research*, 78:2 (2006) 110-117.
Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.
Kingston et al. "New Taxanes from *Taxus brevifolia*," *J of Natural Products*, 45 (1982) 466-470.
Lappas, A. A. et al. "Biomass pyrolysis in a circulating fluid bed reactor for the production of fuels and chemicals," *Fuel*, 81 (2002) 2087-2095.
Lappas, A.A. et al. "Production of Transportation Fuels from Biomass," *Workshop of Chemical Process Engineering Research Institute/Center for Research and Technology Hellas*, Thermi-Thessaloniki, Greece (2004).
Lappas, A.A., "Production of biofuels via co-processing in conventional refining process," *Catalysis Today*, 145 (2009) 55-62.
Maiti, R.N. et al. "Gas-liquid distributors for trickle-bed reactors: A review"; *Industrial and Engineering Chemistry Research*, 46:19 (2007) 6164-6182.
Mancosky, "The use of a controlled cavitation reactor for bio-diesel production," (abstract only), AlChE Spring National Meeting 2007, Houston, Texas.
Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).
Marker, Terry L., et al., UOP, "Opportunities for Biorenewables in Oil Refineries," Final Technical Report, U.S. Department of Energy Award No. DE-FG36-05G015085, Report No. DOEGO15085Final (2005).
Marquevich, "Hydrogen from Biomass: Steam Reforming of Model Compounds of Fast-Pyrolysis Oil," *Energy & Fuels*, 13 (1999) 1160-1166.
Masoumifard, N. et al. "Investigation of heat transfer between a horizontal tube and gas-solid fluidized bed," *International Journal of Heat and Fluid Flow*, 29:5 (2008) 1504-1511.
McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana Zucc*," *J Org Chem*, 46 (1981) 1469-1474.
Mohan, D. et al. "Pyrolysis of Wood/Biomass for Bio-oil: A Critical Review," *Energy Fuels*, 20:3 (2006) 848-849.
Newton "Taxol: A Case Study in Natural Products Chemistry," Lecture Notes, University of Southern Maine, http:/www.usm.maine.edu/ (2009) 1-6.
Nicolaou et al. "Total Synthesis of Taxol," *Nature*, 367 (1994) 630-634.
Nowakowski, D. et al. "Potassium catalysis in the pyrolysis behaviour of short rotation willow coppice." *Fuels*, 86 (2007) 2389-2402.
Ognisty, T. P. "The direct contact heat transfer performance of a spray nozzle, a notched through distributor, and two inch Pall rings," AlChE 1990 Spring National Meeting (Orlando Mar. 18-20, 1990) Preprint N. 37c 36P, Mar. 18, 1990.
Ohman "Bed Agglomeration Characteristics during Fluidized Bed Combustion of Biomass Fuels," *Energy & Fuels*, 14 (2000) 169-178.
Okumura, Y. et al. "Pyrolysis and gasification experiments of biomass under elevated pressure condition," Nihon Kikai Gakkai

(56) References Cited

OTHER PUBLICATIONS

Ronbunshu, B Hen/Transactions of the Japan Society of Mechanical Engineers, Part B, vol. 73, No. 7, 2007, pp. 1434-1441.
Olazar, M. et al. "Pyrolysis of Sawdust in a Conical Spouted-Bed Reactor with a HZSM-5 Catalyst," *AIChE Journal*, 46:5 (2000) 1025-1033.
Onay "Influence of pyrolysis temperature and heating rate on the production of bio-oil and char from safflower seed by pyrolysis, using a well-swept fixed-bed reactor," *Fuel Processing Technology*, 88 (2007) 523-531.
Onay, "Production of Bio-Oil from Biomass: Slow Pyrolysis of Rapeseed (*Brassica napus* L.) in a Fixed-Bed Reactor," *Energy Sources*, 25 (2003) 879-892.
Ong et al. "Pressurized hot water extraction of bioactive or marker compounds in botanicals and medicinal plant materials," *J Chromatography A*, 1112 (2006) 92-102.
Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.
Otterstedt, J. E. et al. "Catalytic Cracking of Heavy Oils," in Occelli, Mario L. (ed) Fluid Catalytic Cracking, Chapter 17, ACS, Washington, DC (1988) 266-278.
Padmaja, K.V. et al. "Upgrading of Candelilla biocrude to hydrocarbon fuels by fluid catalytic cracking," *Biomass and Bioenergy*, 33 (2009) 1664-1669.
Pavia et al., Intro to Org Labo Techniques (1988) 3d ed. Saunders College Publishing, Washington p. 62-66, 541-587.
PCT/US2012/055384 International Search Report, dated Mar. 28, 2013, and International Preliminary Report on Patentability, dated Mar. 25, 2014.
Pecora, A.A.B. et al., "Heat transfer coefficient in a shallow fluidized bed heat exchanger with a continuous flow of solid particles," *Journal of the Brazilian Society of Mechanical Sciences and Engineering*, 28:3 (2006) 253-258.
Pecora, A.A.B., et al., "An analysis of process heat recovery in a gas-solid shallow fluidized bed," *Brazilian Journal of Chemical Engineering*, 23:4 (2006) 497-506.
Petrik, P.T. et al. "Heat exchange in condensation of R227 coolant on inclined tubes placed in a granular BED," *Journal of Engineering Physics and Thermophysics*, 77:4 (2004) 758-761.
Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.
Prins, Wolter et al. "Progress in fast pyrolysis technology," *Topsoe Catalysis Forum 2010*, Munkerupgaard, Denmark (Aug. 19-20, 2010).
Radlein, D. et al. "Hydrocarbons from the Catalytic Pyrolysis of Biomass," *Energy & Fuels*, 5 (1991) 760-763.
Rao "Taxol and Related Taxanes. I. Taxanes of *Taxus brevifolia* Bark," *Pharm Res* 10:4 (1993) 521-524.
Rao et al. "A New Large-Scale Process for Taxol and Related Taxanes from *Taxus brevifolia*," *Pharm Res*, 12:7 (1995) 1003-1010.
Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.
Rodriguez, O.M.H. et al. "Heat recovery from hot solid particles in a shallow fluidized bed," *Applied Thermal Engineering*, 22:2 (2002) 145-160.
Samolada, M. C. et al. "Production of a bio-gasoline by upgrading biomass flash pyrolysis liquids via hydrogen processing and catalytic cracking," *Fuel*, 77:14 (1998) 1667-1674.
Sang "Biofuel Production from Catalytic Cracking of Palm Oil," *Energy Sources*, 25 (2003) 859-869.
Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.
Scott, D. et al. Pretreatment of poplar wood for fast pyrolysis: rate of cation removal, *Journal of Analytical and Applied Pyrolysis*, 57 (2000) 169-176.
Senilh et al. "Mise en Evidence de Nouveaux Analogues du Taxol Extraits de *Taxus baccata*," *J of Natural Products*, 47 (1984) 131-137. (English Abstract included).
Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.
Sharma, R. K. et al. "Catalytic Upgrading of Pyrolysis Oil," *Energy & Fuels*, 7 (1993) 306-314.
Sharma, R. K. et al. "Upgrading of wood-derived bio-oil over HZSM-5," *Bioresource Technology*, 35:1 (1991) 57-66.
Smith R.M. "Extractions with superheated water," *J Chromatography A*, 975 (2002) 31-46.
Snader "Detection and Isolation," in Suffness, M. (ed) *Taxol-Science and Applications*, CRC Press, Boca Raton, Florida (1995) 277-286.
Srinivas, S.T. et al "Thermal and Catalytic Upgrading of a Biomass-Derived Oil in a Dual Reaction System," *Can. J. Chem. Eng.*, 78 (2009) 343-354.
Stierle et al. "The Search for Taxol-Producing Microorganism Among the Endophytic Fungi of the Pacific Yew, *Taxus brevifolia*," *J of Natural Products*, 58 (1995) 1315-1324.
Stojanovic, B. et al. "Experimental investigation of thermal conductivity coefficient and heat exchange between fluidized bed and inclined exchange surface," *Brazilian Journal of Chemical Engineering*, 26:2 (2009) 343-352.
Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).
Twaiq, A. A. et al. "Performance of composite catalysts in palm oil cracking for the production of liquid fuels and chemicals," *Fuel Processing Technology*, 85 (2004) 1283-1300.
Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.
Tyson, K. et al. "Biomass Oil Analysis: Research Needs and Recommendations," National Renewable Energy Laboratory, Report No. NREL/TP-510-34796 (Jun. 2004).
Valle, B. et al. "Integration of Thermal Treatment and Catalytic Transformation for Upgrading Biomass Pyrolysis Oil," *International Journal of Chemical Reactor Engineering*, 5:1 (2007).
Vasanova, L.K. "Characteristic features of heat transfer of tube bundles in a cross water-air flow and a three-phase fluidized bed," *Heat Transfer Research*, 34:5-6 (2003) 414-420.
Vitolo, S. et al. "Catalytic upgrading of pyrolytic oils over HZSM-5 zeolite: behaviour of the catalyst when used in repeated upgrading-regenerating cycles," *Fuel*, 80 (2001) 17-26.
Vitolo, S. et al. "Catalytic upgrading of pyrolytic oils to fuel over different zeolites," *Fuel*, 78:10 (1999) 1147-1159.
Wang, Xianhua et al., "The Influence of Microwave Drying on Biomass Pyrolysis," *Energy & Fuels* 22 (2008) 67-74.
Westerhof, Roel J. M. et al., "Controlling the Water Content of Biomass Fast Pyrolysis Oil," *Ind. Eng. Chem. Res.* 46 (2007) 9238-9247.
Williams, Paul T. et al. "Characterisation of oils from the fluidised bed pyrolysis of biomass with zeolite catalyst upgrading," *Biomass and Bioenergy*, 7:1-6 (1994) 223-236.
Williams, Paul T. et al. "Comparison of products from the pyrolysis and catalytic pyrolysis of rice husks," *Energy*, 25:6 (2000) 493-513.
Williams, Paul T. et al. "The influence of catalyst type on the composition of upgraded biomass pyrolysis oils," *J Analytical and Applied Pyrolysis*, 31 (1995) 39-61.
Yukimune et al. "Methyl Jasmonate-induced Overproduction of Paclitaxel and Baccatin III in Taxus Cell Suspension Cultures," *Nature Biotechnology* 14 (1996) 1129-1132.
Zhang et al. "Investigation on initial stage of rapid pyrolysis at high pressure using Taiheiyo coal in dense phase," *Fuel*, 81:9 (2002) 1189-1197.

(56) References Cited

OTHER PUBLICATIONS

Zhang, "Hydrodynamics of a Novel Biomass Autothermal Fast Pyrolysis Reactor: Flow Pattern and Pressure Drop," *Chern. Eng. Technol.*, 32:1 (2009) 27-37.

Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.

Wisner, R. "Renewable Identification Numbers (RINs) and Government Biofuels Blending Mandates," *AgMRC Renewable Energy Newsletter* (Apr. 2009), available at http://www.agmrc.org/renewable_energy/biofuelsbiorefining_general/renewable-identification-numbers-rins-and-government-biofuels-blending-mandates/.

Qi et al. "Review of biomass pyrolysis oil properties and upgrading research," *Energy Conversion & Management*, 48 (2007) 87-92.

Yoo et al. "Thermo-mechanical extrusion pretreatment for conversion of soybean hulls to fermentable sugars," *Bioresource Technology*, 102 (2011) 7583-7590.

\* cited by examiner

METHODS AND APPARATUSES FOR
THERMALLY CONVERTING BIOMASS

TECHNICAL FIELD

The present invention generally relates to methods and apparatuses for thermally converting, or pyrolyzing, biomass and more particularly relates to methods and apparatuses for thermally converting biomass that operate at controlled oxygen levels.

BACKGROUND

Renewable energy sources are of increasing importance. They are a means of reducing dependence on oil and they provide a substitute for other fossil fuels. Also, renewable energy resources can provide for basic chemical constituents to be used in other industries, such as chemical monomers for the making of plastics. Biomass is a renewable resource that can supply some of the need for renewables-based chemicals and fuels.

Biomass includes, but is not limited to, lignin, plant parts, fruits, vegetables, plant processing waste, wood chips, chaff, grains, grasses, corn and corn husks, weeds, aquatic plants, hay, recycled and non-recycled paper and paper products, and any cellulose-containing biological material or material of biological origin. The economics of producing oil from biomass depend on the yield of oil produced from a quantity of biomass. When heated in an environment with low or no oxygen, biomass is thermally converted, or pyrolyzed, to generate a liquid known as pyrolysis oil. A modern form of pyrolysis, or rapid thermal conversion, is conducted under moderate temperatures, typically 400° C. to 600° C., and short residence times, such as less than 5 seconds. An example is flash pyrolysis that operates under such conditions and produces a pourable liquid product or pyrolysis oil from the thermal conversion of biomass feedstock or petroleum-based feedstock. Pyrolysis oil thermally converted from biomass feedstock has a higher energy density than the biomass feedstock. Further, the pyrolysis oil thermally converted from biomass feedstock is more easily stored and transported than the biomass feedstock. For economic reasons, it is typically desirable to maximize the yield of pyrolysis oil from the thermal conversion process.

In conventional flash pyrolysis processes, biomass is thermally converted in a reactor during a short contact duration, such as less than about 2 seconds, with a high temperature heat transfer medium, such as a solid heat carrier at about 500° C. This solid heat carrier can be silica sand, low activity catalyst, or other inert material. Typical thermal conversion processes allow oxygen to enter the thermal conversion reactor through the biomass inlet along with the biomass. Further, typical thermal conversion processes utilize equipment or instruments in the reactor system that must be protected from interference by the solid heat carrier or solid product from the thermal conversion of the feedstock. Generally, the instruments are purged with air to dislodge the solid matter or to prevent its intrusion into the instruments. However, the introduction of additional oxygen through the biomass inlet and instrument purge inlets reduces the pyrolysis oil yield proportionally to the amount of oxygen added. As a result, a typical thermal conversion unit exhibits up to about a 2% liquid yield loss due to the ingress of additional oxygen into the thermal conversion reactor.

Accordingly, it is desirable to provide methods and apparatuses for thermally converting biomass with improved pyrolysis oil yield. Further, it is desirable to provide methods and apparatuses for thermally converting biomass which inhibit ingress of oxygen. Also, it is desirable to provide methods and apparatuses for thermally converting biomass which control the oxygen level within a thermal conversion reactor. Furthermore, other desirable features and characteristics will become apparent from the subsequent detailed description and the appended claims, taken in conjunction with the accompanying drawings and the foregoing technical field and background.

BRIEF SUMMARY

Methods and apparatuses for thermally converting biomass are provided. In accordance with an exemplary embodiment, a method of thermally converting biomass includes introducing the biomass to a reactor feed chamber. The method provides for flowing a low oxygen gas into the reactor feed chamber to purge the reactor feed chamber and biomass of oxygen. The method also includes delivering the purged biomass to a reactor and thermally converting the biomass in the reactor.

In accordance with another exemplary embodiment, a method for thermally converting biomass includes delivering the biomass to a thermal conversion reactor and introducing a carrier gas having a selected oxygen content to the thermal conversion reactor. The carrier gas carries the biomass through the thermal conversion reactor. The method includes thermally converting the biomass in the thermal conversion reactor and inhibiting the introduction of additional oxygen to the thermal conversion reactor.

In accordance with another exemplary embodiment, an apparatus for thermally converting biomass includes a reactor feed chamber for holding the biomass. The apparatus further includes a thermal conversion reactor configured to thermally convert the biomass and in communication with the reactor feed chamber for receiving the biomass. An instrument is provided in communication with the thermal conversion reactor and is adapted to monitor conditions in the thermal conversion reactor. Further, the apparatus includes a purge line in communication with the reactor feed chamber and the instrument and adapted to flow low oxygen gas into the reactor feed chamber and into the instrument to inhibit the introduction of oxygen into the thermal conversion reactor.

BRIEF DESCRIPTION OF THE DRAWINGS

Embodiments of the methods and apparatuses for thermally converting, or pyrolyzing, biomass will hereinafter be described in conjunction with the following drawing figures, wherein like numerals denote like elements, and wherein.

DETAILED DESCRIPTION

The following detailed description is merely exemplary in nature and is not intended to limit the methods and apparatuses for thermally converting biomass. Furthermore, there is no intention to be bound by any expressed or implied theory presented in the preceding technical field, background or brief summary, or in the following detailed description.

It is contemplated herein that the thermal conversion of biomass can be improved under conditions in which oxygen levels are controlled at selected levels. Specifically, the methods and apparatuses for thermally converting biomass described herein can be used to limit the volume of oxygen introduced to a thermal conversion reactor. Conventional thermal conversion processes utilize a carrier gas having a desired oxygen level, such as no more than about 5 vol %, which enters the thermal conversion reactor and carries the biomass through the thermal conversion reactor during the thermal conversion reaction. However, in the conventional thermal conversion processes, additional oxygen enters the thermal conversion reactor, such as through the biomass inlet, through instrument purge inlets, and/or through the heat transfer medium inlet. The methods and apparatuses for thermally converted biomass described herein eliminate or inhibit the introduction of oxygen through the biomass inlet, instrument purge inlets, and/or heat transfer medium inlet through the use of oxygen-free or low oxygen purge gases. As used herein, "oxygen-free" refers to gases containing substantially 0 vol % oxygen, and "low oxygen" refers to gases having an oxygen content lower than that of air, i.e., less than about 20 vol % oxygen.

Figure 1:
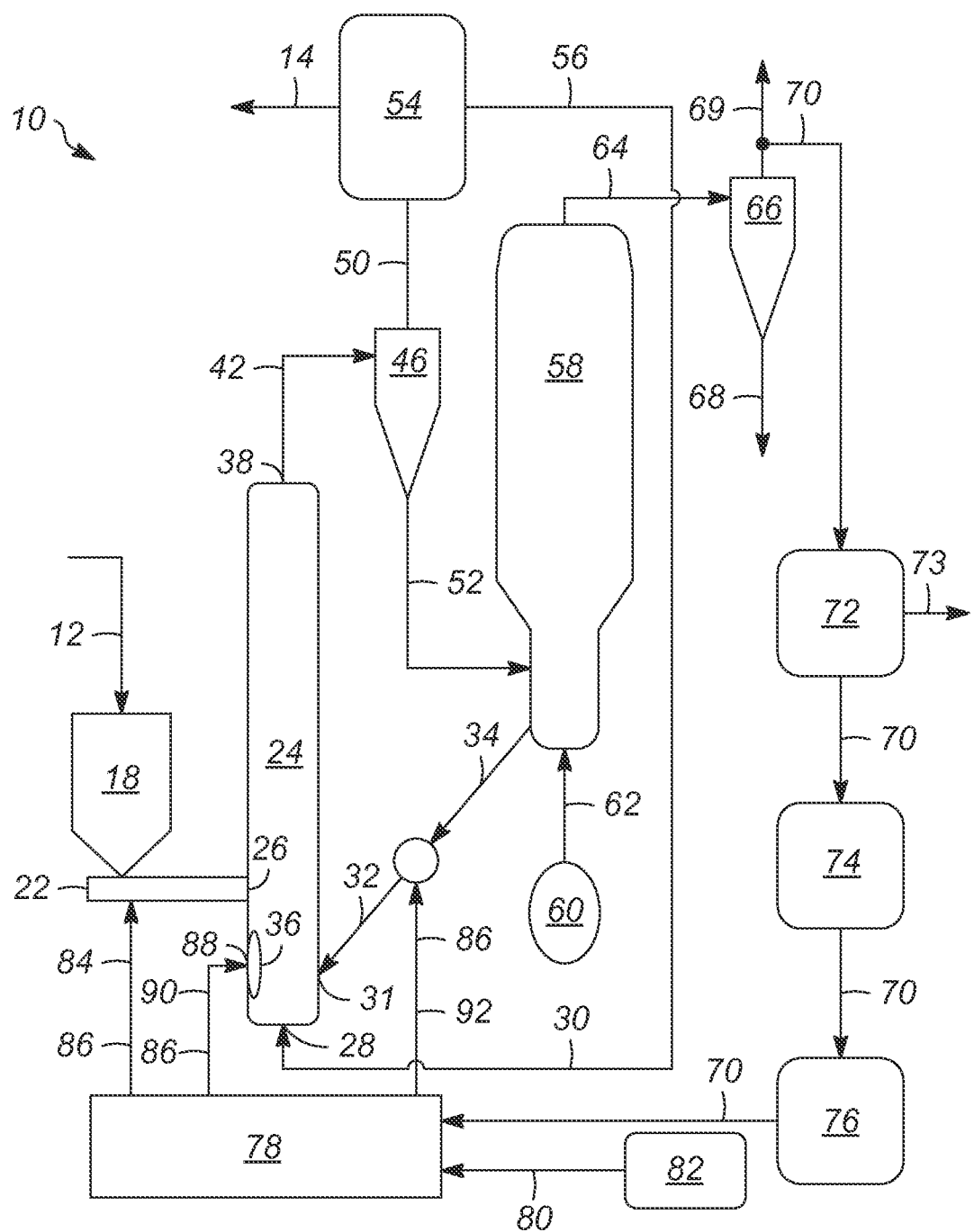
FIG. 1 is a schematic illustrating an apparatus for thermally converting biomass in accordance with various embodiments herein.

In accordance with the various embodiments herein, FIG. 1 illustrates an apparatus 10 for thermally converting biomass 12 to produce pyrolysis oil 14. As in a conventional system, the apparatus 10 includes a hopper or feed bin 18 for receiving the biomass 12. The hopper 18 is in communication with a reactor feed chamber 22 formed by, for example, an auger, a screw feed device, a conveyor, or other batch feed device. The reactor feed chamber 22 is further selectively connected to a thermal conversion or pyrolysis reactor 24 configured to thermally convert or pyrolyze the biomass 12. The thermal conversion reactor 24 includes a biomass inlet 26 for receiving the biomass 12 from the reactor feed chamber 22. Further, the thermal conversion reactor 24 includes a carrier gas inlet 28 for receiving a carrier gas 30. The thermal conversion reactor 24 may also include a solid heat transfer medium inlet 31 to receive hot heat transfer medium 32, such as sand, catalyst, or other inert particulate, via line 34. Alternatively, the heat transfer medium 32 may be mixed with and carried by the carrier gas 30 through the carrier gas inlet 28. As shown, the thermal conversion reactor 24 is outfitted with at least one instrument 36, such as temperature or pressure instruments for monitoring conditions within the thermal conversion reactor 24.

As the biomass 12 is heated by the heat transfer medium 32 to the thermal conversion or pyrolysis temperature, typically about 540° C., the thermal conversion or pyrolysis reaction occurs and pyrolysis vapor and char are formed in the thermal conversion reactor 24. The pyrolysis vapor and char, along with the heat transfer medium, are carried out of an outlet 38 in the thermal conversion reactor 24 and through a line 42 to a separator 46, such as, for example, a cyclone. The separator 46 separates the pyrolysis vapor 50 from the char and heat transfer medium 52. As shown, the pyrolysis vapor 50 is directed to a condenser 54 which condenses the pyrolysis vapor 50 to form the pyrolysis oil 14. Uncondensed gas 56 exits the condenser 54 and may be recycled as the carrier gas 30. Typically, the carrier gas 30 includes a low level of oxygen such as no more than about 5 percent by volume (vol %).

The char and heat transfer medium 52 are fed to a combustion unit 58, typically referred to as a reheater, for the purpose of reheating the heat transfer medium. As shown, a blower 60 feeds air 62 or another oxygen-containing gas into the combustion unit 58. Upon contact with the oxygen, the char combusts, heating the heat transfer medium and forming flue gas and ash. The hot heat transfer medium 32 exits the combustion unit 58 and is returned to the thermal conversion reactor 24 via line 34. The flue gas and ash exit the combustion unit 58 through line 64 and are directed to a separator 66, such as a cyclone. The separator 66 then removes the ash 68 which can be disposed of.

In an exemplary embodiment, the separated flue gas 69 exits the separator 66 and a portion 70 can be recycled for use as a low oxygen purge gas for inhibiting the entry of oxygen into the thermal conversion reactor 24. Typically, the recycled flue gas 70 will comprise carbon oxides, specifically carbon dioxide and carbon monoxide, nitrogen, water vapor, and a low level of oxygen, such as less than about 10 vol %, for example about 5 vol %.

Optionally, the recycled flue gas 70 may be fed to a cooler/separator 72 which condenses and removes the water vapor in stream 73. Further, to reduce the amount of oxygen in the recycled flue gas 70, it may be passed through an optional reduction unit 74 such as, for example, a membrane, a pressure swing adsorber or other adsorber, or a combustor. The unit 74 may be operated to remove substantially all oxygen from the recycled flue gas 70, or to reduce the oxygen level to a selected acceptable amount, such as no more than about 5 vol %. As shown, the recycled flue gas 70 is fed to a compressor 76 where it is compressed to an appropriate pressure for use in purging, such as about 20 psig to about 120 psig, for example to about 50 psig. The compressed recycled flue gas 70 is then delivered to a purge gas header 78 for use as the purge gas.

While the purge gas header 78 may be supplied with recycled flue gas 70 as described above, other exemplary embodiments may alternatively or additionally provide the purge gas header 78 with gas 80 supplied by an inert gas source 82. For example, the inert gas source 82 can be a generator, including a separator such as a pressure swing adsorber, a unit for removing reactive gases, or any other apparatus that generates a concentrated inert gas or combination of inert gases, such as nitrogen, argon, helium or others. The inert gas 80 may be delivered to the purge gas header 78 at a selected pressure, such as, for example, 100 psig.

As shown, the purge gas header 78 is connected to the reactor feed chamber 22 by a purge line 84. Therefore, when biomass 12 is received within the reactor feed chamber 22, the oxygen-free or low oxygen purge gas 86 in the purge gas header 78 may be flowed through the purge line 84 into the reactor feed chamber 22 and across the biomass 12 to purge any oxygen therefrom. Further, the instruments 36 within the thermal conversion reactor 24 can become jammed or otherwise impacted with particulate, such as heat transfer medium 32 or char. Apparatus 10 provides the thermal conversion reactor 24 with an instrument inlet 88 for each instrument 36. Each instrument inlet 88 is in communication with the purge gas header 78 via purge line 90. Therefore, the purge gas 86 can be flowed through the purge line 90 and instrument inlets 88 and into or over the instruments 36 to dislodge any heat transfer medium or char or prevent lodging of any heat transfer medium or char, and to maintain proper instrument operation. Also, apparatus 10 further provides a purge line 92 for connecting the purge gas header 78 to the line 34 carrying the reheated heat transfer medium 32 to the thermal conversion reactor 24. With this connection, the purge gas 86 can be flowed through purge line 92 and over the hot heat transfer medium 32 in line 34 to purge any oxygen from the medium's interstitial volume. Purge line 92 is of particular utility when the combustion unit 58 is run with excess air to provide temperature control. As a result of operating the combustion unit 58 with excess air, the oxygen content of recycled flue gas 70 may be as high as about 10 vol % and the heat transfer medium 32 may carry with it a non-insubstantial amount of oxygen. In such circumstances, performance of the thermal conversion reactor 24 is enhanced by purging the heat transfer medium 32.

In summary, the apparatus 10 provides for improved pyrolysis oil yield from biomass by purging the biomass 12, instruments 36, and heat transfer medium 32 with the oxygen-free or low oxygen purge gas 86 before introduction into the thermal conversion reactor 24. As a result, a controlled amount of oxygen enters the thermal conversion reactor 24 through biomass inlet 26, instrument inlet 88 and heat transfer medium inlet 31.

Figure 2:
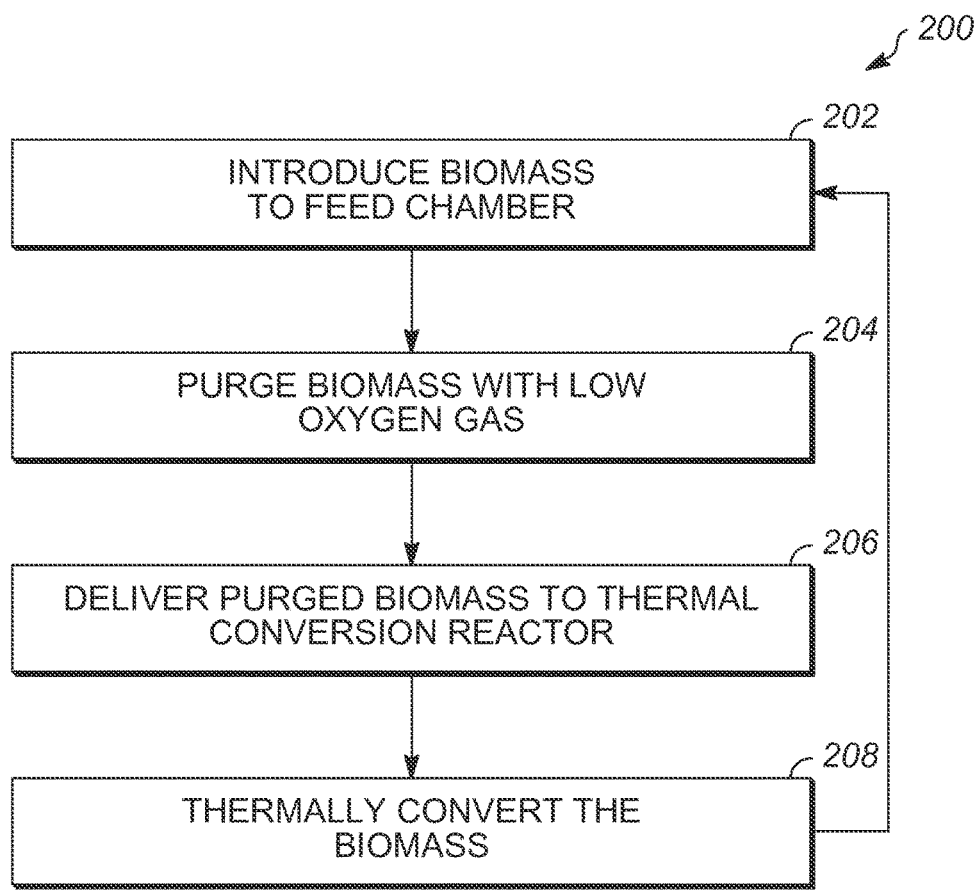
FIG. 2 is a flow chart illustrating an exemplary method for thermally converting biomass which includes purging the biomass feed with an oxygen-free or low oxygen gas in accordance with an embodiment herein.

An exemplary method 200 for thermally converting biomass is illustrated in FIG. 2. As shown, method 200 introduces biomass to a feed chamber at step 202. Then, at step 204, the biomass is purged with low oxygen gas (including, in certain embodiments, oxygen-free gas). This purging step removes air from void space in and around the biomass. After the biomass is purged of air, it is delivered to the thermal conversion reactor at step 206. At step 208, the biomass is thermally converted into pyrolysis oil. As the thermal conversion reaction occurs, additional biomass is introduced to the feed chamber, and the process continues.

As discussed above, a carrier gas including a selected amount of oxygen also enters the thermal conversion reactor to carry the biomass through the thermal conversion reactor. As a result of the method 200 for thermally converting biomass, the introduction into the thermal conversion reactor of additional oxygen, i.e., oxygen not present in the carrier gas, is inhibited. Specifically, while a selected amount of oxygen may enter the thermal conversion reactor in the carrier gas through the carrier gas inlet, little or substantially no oxygen enters the thermal conversion reactor through the biomass inlet. In other words, the method 200 for thermally converting biomass purges the biomass of oxygen in the reactor feed chamber such that substantially no, or a limited amount of, oxygen enters the thermal conversion reactor through the biomass inlet.

Figure 3:
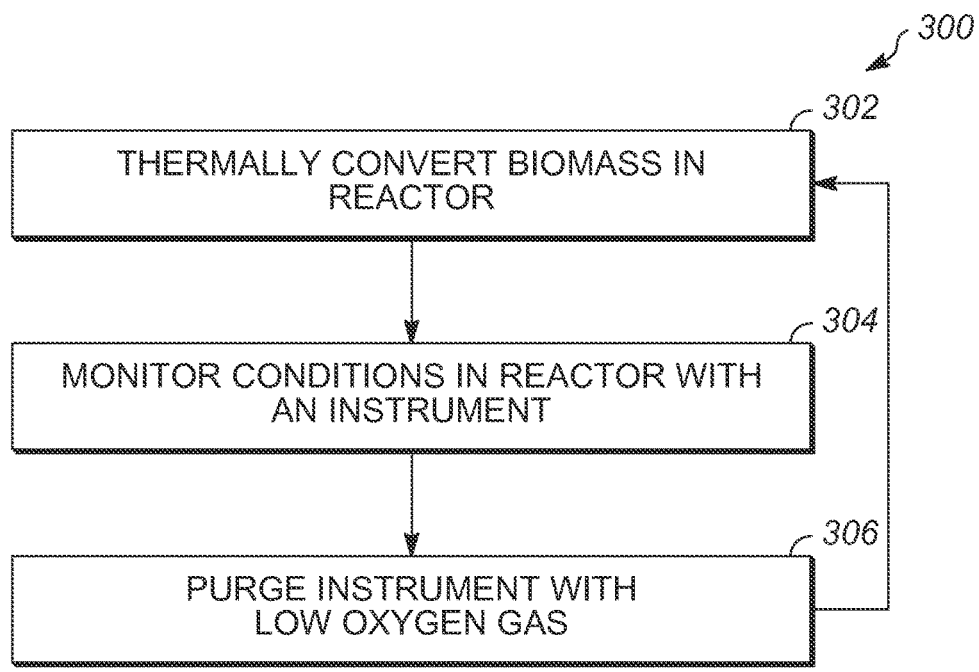
FIG. 3 is a flow chart illustrating an exemplary method for thermally converting biomass which includes purging process monitoring instruments with an oxygen-free or low oxygen gas in accordance with an embodiment herein.

FIG. 3 illustrates an exemplary method 300 for thermally converting biomass. The method 300 may be performed in addition to method 200 or alternatively to method 200, depending on the specific thermal conversion apparatus design and operation. As shown, method 300 thermally converts biomass in the thermal conversion reactor at step 302. At step 304, conditions within the thermal conversion reactor are monitored with instruments, such as pressure or temperature instruments. Because the instruments may be clogged or otherwise impaired by particulates inside the thermal conversion reactor, the method 300 provides for purging the instruments with low oxygen gas (including oxygen-free gas in certain embodiments) at step 306. By purging the instruments with low oxygen gas, particulates are dislodged from, or prevented from lodging in, the instruments. The thermal conversion, monitoring, and purging steps of the method 300 are continuous and concurrently performed during operation of the apparatus.

As a result of the method 300 for thermally converting biomass, the introduction into the thermal conversion reactor of additional oxygen, i.e., oxygen not present in the carrier gas, is inhibited. Specifically, while a selected amount of oxygen may enter the thermal conversion reactor through the carrier gas inlet, little or substantially no oxygen enters the thermal conversion reactor through the instrument inlets. In other words, the method 300 for thermally converting biomass purges the instrument with low oxygen gas such that substantially no, or a limited amount of, oxygen enters the thermal conversion reactor through the instrument inlets.

Figure 4:
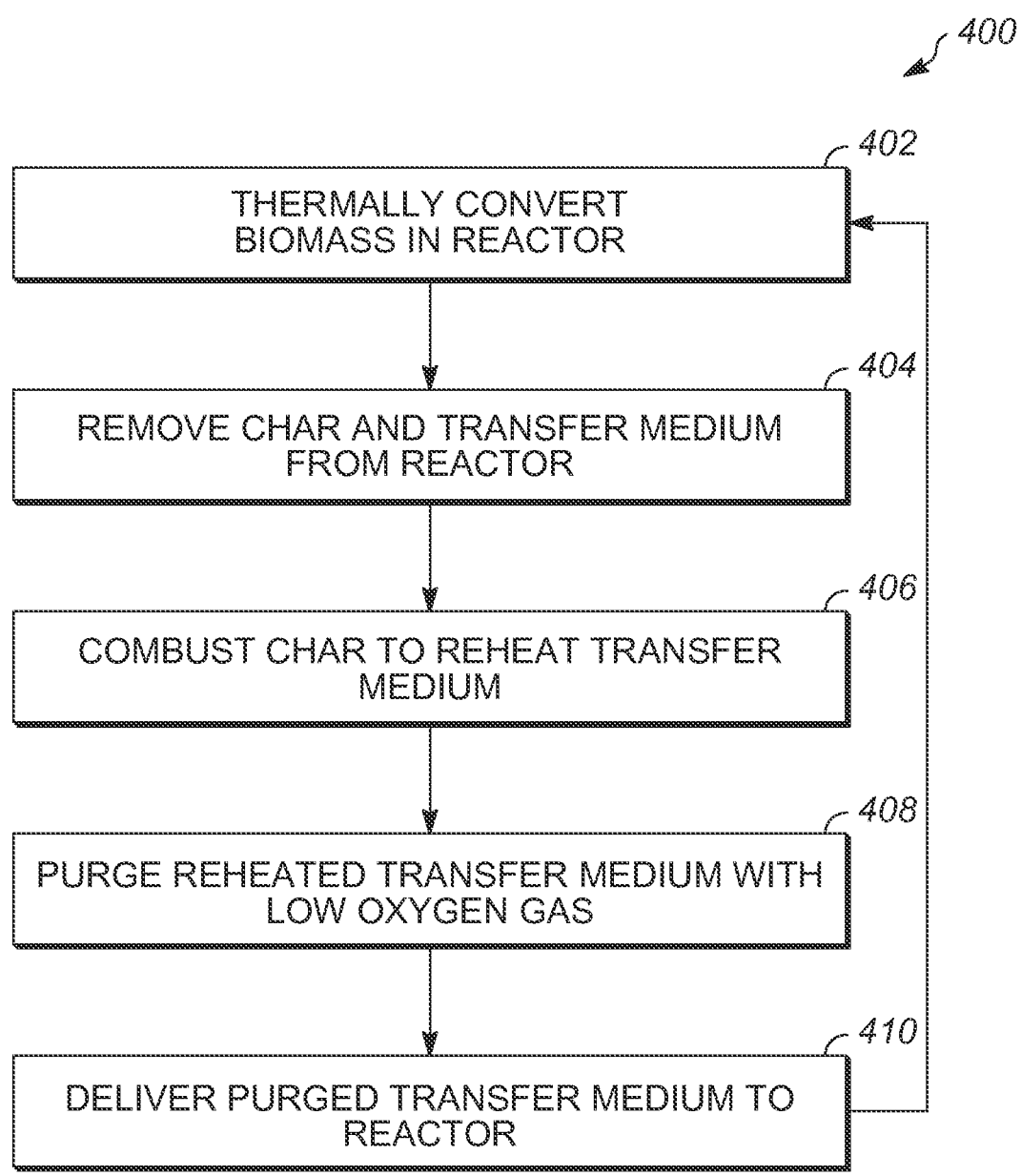
FIG. 4 is a flow chart illustrating an exemplary method for thermally converting biomass which includes purging the heat transfer medium with an oxygen-free or low oxygen gas in accordance with an embodiment herein.

FIG. 4 illustrates an exemplary method 400 for thermally converting biomass. The method 400 may be performed in addition to methods 200 and/or 300 or alternatively to methods 200 and/or 300, depending on the specific thermal conversion apparatus design and operation. As shown, method 400 thermally converts biomass in the thermal conversion reactor at step 402. At step 404, char and the heat transfer medium are removed from the thermal conversion reactor. The char and heat transfer medium are fed to a combustion unit where the char is combusted to reheat the heat transfer medium at step 406. The reheated heat transfer medium then exits the combustion unit and is purged with low oxygen purge gas (including oxygen-free purge gas in certain embodiments) at step 408. Step 410 delivers the purged transfer medium to the thermal conversion reactor. As shown, the steps of method 400 are performed continuously and concurrently during a thermal conversion process.

As a result of the method 400 for thermally converting biomass, the introduction into the thermal conversion reactor of additional oxygen, i.e., oxygen not present in the carrier gas, is inhibited. Specifically, while a selected amount of oxygen may enter the thermal conversion reactor through the carrier inlet, little or substantially no oxygen enters the thermal conversion reactor through the heat transfer medium inlet. In other words, the method 400 for thermally converting biomass purges the heat transfer medium with low oxygen gas such that substantially no, or a limited amount of, oxygen enters the thermal conversion reactor through the heat transfer medium inlet.

Figure 5:
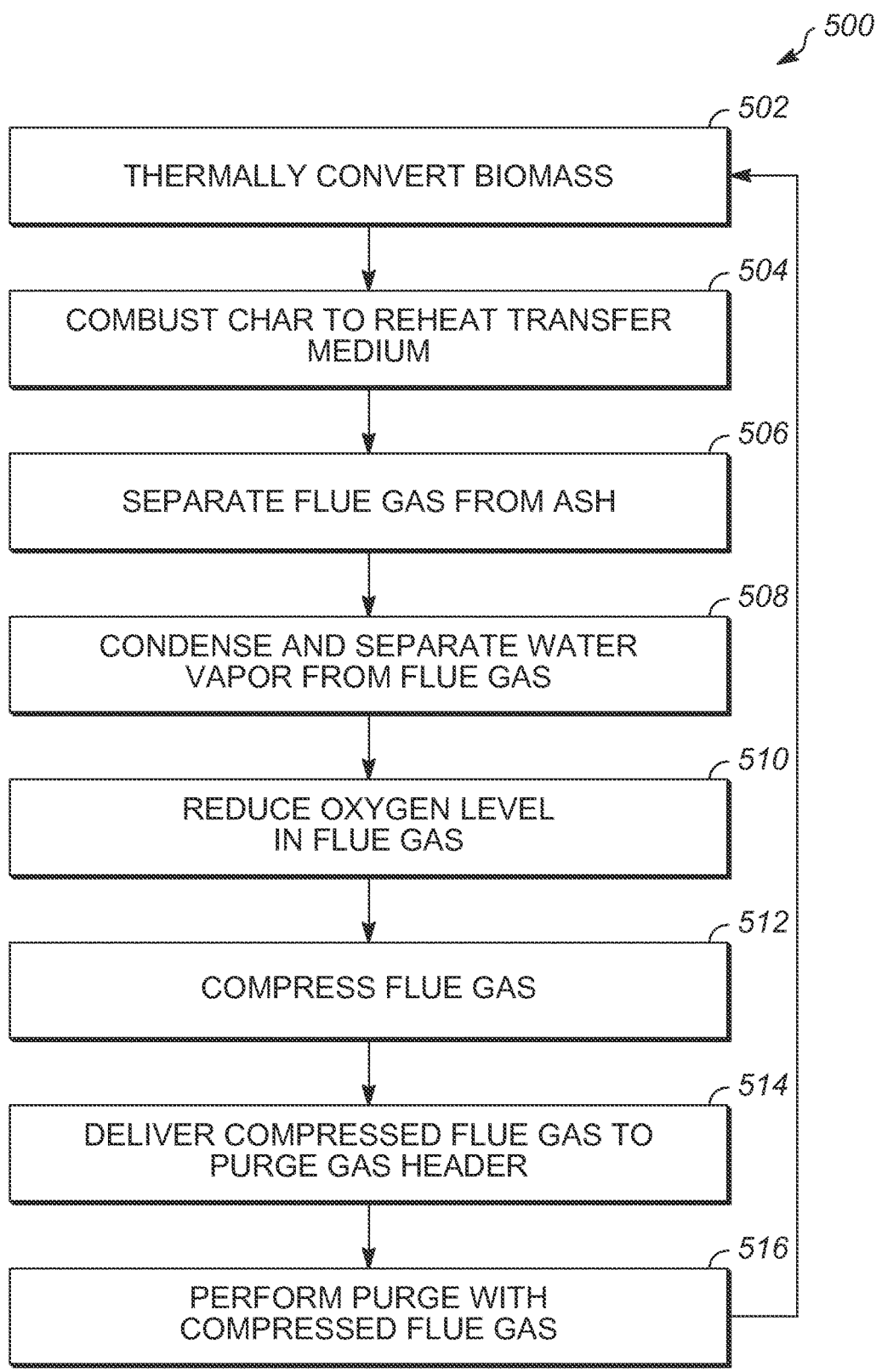
FIG. 5 is a flow chart illustrating an exemplary method for thermally converting biomass which includes forming an oxygen-free or low oxygen gas purge gas from a recycled flue gas in accordance with an embodiment herein.

FIG. 5 illustrates an exemplary method 500 for thermally converting biomass. The method 500 supplies the purge gas for the purging steps of methods 200, 300 and 400. In step 502, biomass is thermally converted in a thermal conversion reactor. Thermal conversion of biomass produces char. The char is removed from the thermal conversion reactor along with the heat transfer medium. Then the char is combusted at step 504 to reheat the heat transfer medium. Combustion of the char produces a flue gas and ash. In step 506, the flue gas is separated from the ash, such as with a cyclone. Optionally, the flue gas is delivered to a condenser where water vapor in the flue gas is condensed and separated from the remaining flue gas at step 508. In optional step 510, the oxygen level in the flue gas is reduced, such as by a membrane, a pressure swing adsorber or other adsorber, or a combustor. The flue gas is compressed at step 512 to a suitable pressure for purging processes, for example, to about 50 psig. Then, the compressed flue gas is delivered to a purge gas header at step 514. Step 516 performs a purge with the compressed flue gas, such as of the biomass, monitoring instruments, or the reheated heat transfer medium as discussed in relation to methods 200, 300 and 400.

Figure 6:
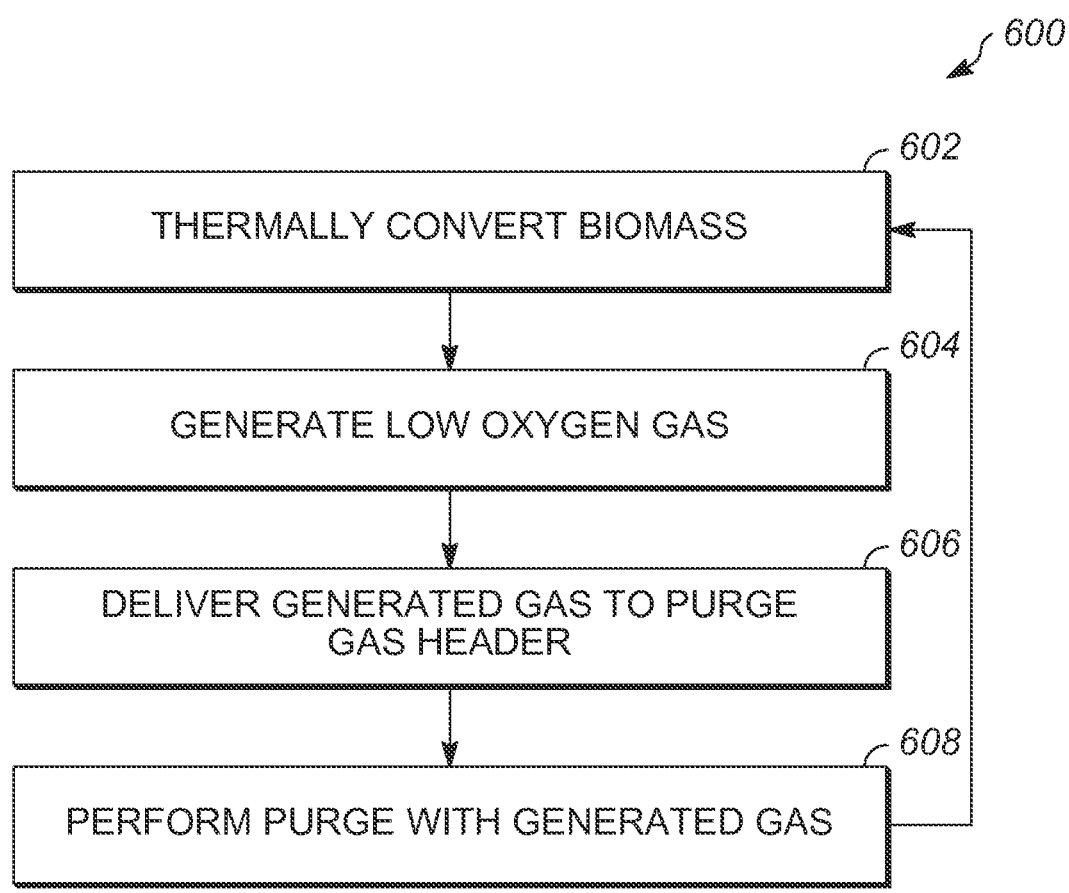
FIG. 6 is a flow chart illustrating an exemplary method for thermally converting biomass which includes generating an oxygen-free or low oxygen purge gas in accordance with an embodiment herein.

FIG. 6 illustrates an exemplary method 600 for thermally converting biomass. The method 600 may be performed in addition to, or alternatively to, the method 500 and supplies the purge gas for the purging steps of methods 200, 300 and 400. In step 602, biomass is thermally converted in a thermal conversion reactor. In step 604, low oxygen gas (including oxygen-free gas) is generated, such as by separation of an external source of inert gas or by any process concentrating an inert gas (including an inert gas formed by multiple inert components). Nitrogen, helium, argon, other low oxygen gases, or a combination thereof may be generated according to known processes. For example, the inert gas may be generated by separating nitrogen from air, or by combusting oxygen out of air. In an exemplary embodiment, the generated gas has a pressure of about 100 psig. The generated gas is delivered to the purge gas header at step 606. Step 608 performs a purge with the generated gas, such as of the biomass, monitoring instruments, or the reheated heat transfer medium as discussed in relation to methods 200, 300 and 400. The method 600 may be repeated continuously during a typical thermal conversion process.

In an exemplary operation of the apparatus 10 of FIG. 1, any or all of methods 200, 300 and 400, and at least one of methods 500 and 600, is performed. For example, the operation begins with biomass 12 being introduced into the reactor feed chamber 22. Then, the purge gas 86 (sourced from recycled flue gas 70 or generated gas 80) is flowed into the reactor feed chamber 22 and purges oxygen from the reactor feed chamber 22 and from the biomass 12. Thereafter, the purged biomass 12 is delivered into the thermal conversion reactor 24 with little or substantially no oxygen. The carrier gas 30 having a selected oxygen content is introduced to the thermal conversion reactor 24 through the carrier gas inlet 28. In order to provide the necessary heat for thermal conversion, the heat transfer medium 32 is fed to the thermal conversion reactor 24 through the heat transfer medium inlet 31. First, however, the heat transfer medium 32 is purged of oxygen by flowing the purge gas 86 over or across the heat transfer medium 32 in line 34. The carrier gas 30 carries the purged biomass 12 and purged heat transfer medium 32 through the thermal conversion reactor 24, and the biomass 12 is thermally converted or pyrolyzed, producing pyrolysis vapor and char. Conditions within the thermal conversion reactor 24 are monitored by at least one instrument 36. In order to enable proper operation of the instrument 36, the purge gas 86 is flowed into or over the instrument 36 to dislodge, or to prevent the lodging of, any particulates, such as heat transfer medium or char.

During the exemplary operation of the apparatus 10 of FIG. 1 to thermally convert biomass, the introduction into the thermal conversion reactor 24 of additional oxygen, i.e., oxygen not present in the carrier gas 30, is inhibited. Specifically, while a selected amount of oxygen may enter the thermal conversion reactor 24 through the carrier gas inlet 28, little or substantially no oxygen enters the thermal conversion reactor 24 through other inlets, e.g., inlets 26, 31, 88. For example, the biomass 12 is purged of oxygen by the purge gas 86 in the reactor feed chamber 22 such that substantially no, or a limited amount of, oxygen enters the thermal conversion reactor 24 through the biomass inlet 26. Instruments 36 in the thermal conversion reactor 24 are purged with the purge gas 86 such that substantially no, or a limited amount of, oxygen enters the thermal conversion reactor 24 through the instrument inlets 88. Also, the heat transfer medium 32 is purged of oxygen by the purge gas 86 before introduction into the thermal conversion reactor 24 such that substantially no, or a limited amount of, oxygen enters the thermal conversion reactor 24 through the heat transfer medium inlet 31.

To briefly summarize, the methods and apparatuses described herein can be used to thermally convert biomass under conditions with a controlled level of oxygen. As a result, the methods and apparatuses herein can be used to efficiently convert biomass into pyrolysis oil with minimized loss in the yield of pyrolysis oil.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of filing this patent application

What is claimed is:

1. A method, comprising:
    i) introducing char and a heat transfer medium into a reheater;
    ii) combusting at least a portion of the char with an excess amount of an oxygen-containing gas to form an oxygen-containing flue gas and a heated heat transfer medium;
    iii) adjusting said excess amount of the oxygen containing gas to control the reheater temperature;
    iv) forming a low-oxygen carrier gas, comprising: passing at least a portion of the oxygen-containing flue gas through an external reduction unit; and
    v) contacting a biomass with the heated heat transfer medium and a portion of the low-oxygen carrier gas in a fast pyrolysis reactor to form the char,
    wherein said low-oxygen carrier gas has an oxygen content of about 0 vol %.

2. The method of claim 1, further comprising:
    dewatering the at least a portion of the oxygen-containing flue gas.

3. The method of claim 1, further comprising:
    compressing the low-oxygen carrier gas.

4. The method of claim 1, wherein the oxygen-containing gas is air.

5. The method of claim 1, wherein the heat transfer medium is sand.

6. The method of claim 1, wherein the reduction unit comprises a combustor.

7. The method of claim 1, wherein the reduction unit comprises a membrane.

8. The method of claim 1, wherein the reduction unit comprises an absorber.

9. The method of claim 1, wherein the oxygen-containing flue gas has an oxygen content of no more than 10 vol %.

10. The method of claim 1, wherein the low-oxygen carrier gas has an oxygen content of no more than 5 vol %.

11. The method of claim 1, wherein a further portion of the low-oxygen carrier gas is used to purge one or more instrument purge inlet components of the biomass flash pyrolysis reactor.

12. The method of claim 1, wherein a further portion of the low-oxygen carrier gas is used to purge the biomass prior to thermal conversion.

13. The method of claim 1, wherein a further portion of the low-oxygen carrier gas is used to purge the heated heat transfer medium prior to introduction of the heated heat transfer medium to the thermal conversion unit.

14. The method of claim 1, further comprising:
   vi) dewatering the at least a portion of the oxygen-containing flue gas; and
   vii) compressing the low-oxygen carrier gas to a pressure of between 20 psig and 120 psig,
wherein:
   a) the oxygen-containing gas is air;
   b) the heat transfer medium is inert; and
   c) a further portion of the low-oxygen carrier gas is used to purge one or more instrument purge inlet components of the biomass flash pyrolysis reactor.

15. The method of claim 14, wherein the heat transfer medium is sand.

16. The method of claim 1, further comprising:
   i) dewatering the at least a portion of the oxygen-containing flue gas; and
   ii) compressing the low-oxygen carrier gas to a pressure of between 20 psig and 120 psig,
wherein:
   a) the oxygen-containing gas is air;
   b) the heat transfer medium is sand; and
   c) a further portion of the low-oxygen carrier gas is used to purge one or more instrument purge inlet components of the biomass flash pyrolysis reactor.

17. The method of claim 16, wherein the reduction unit is a combustor.

18. The method of claim 16, wherein the reduction unit is a pressure-swing absorber.

* * * * *